April 14, 1959     E. F. ENGSTROM     2,881,825
ADJUSTABLE LOCK RING SAFETY CLAMP FOR TRUCK WHEELS
Filed May 17, 1955
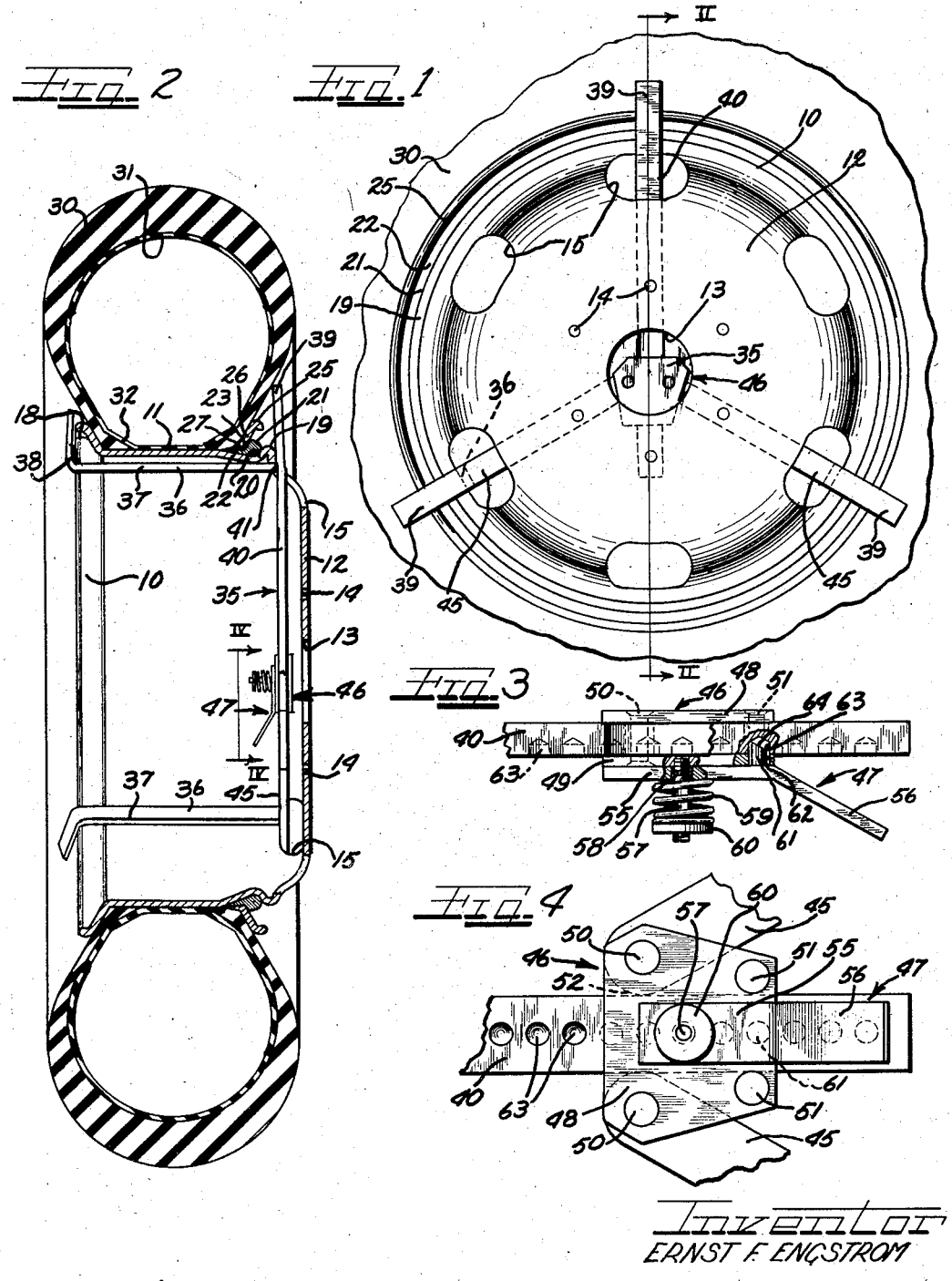
Inventor
ERNST F. ENGSTROM

United States Patent Office 2,881,825
Patented Apr. 14, 1959

2,881,825

ADJUSTABLE LOCK RING SAFETY CLAMP FOR TRUCK WHEELS

Ernst F. Engstrom, Maywood, Ill.

Application May 17, 1955, Serial No. 508,981

4 Claims. (Cl. 157—1)

This invention relates to tire rim clamps and more particularly to a lock ring safety clamp for vehicle tire wheels.

An object of the present invention is to provide a safety clamp sturdy and simple in construction, and economical to manufacture.

Another object of the present invention is to provide a safety clamp to adjustably fit various sizes of tire rims, particularly the rims of heavy vehicles such as trucks and buses.

A further object of the present invention is to provide a safety clamp of collapsible compact construction to permit the device to be conveniently stowed away in the tool compartment of the vehicle. This feature of portability also eliminates the necessity for cumbersome frame structures frequently maintained in truck repair shops to prevent lock rings from flying off truck wheels during inflation of their tires with consequent injury to service men.

Yet another object of the present invention is to provide a safety clamp having a simple slide and latch mechanism to permit rapid adjustment of the device on a wheel and quick removal therefrom.

Other objects and features of this invention will more fully appear from the following detailed description taken in conjunction with the accompanying drawings which illustrate several views of one embodiment thereof, and in which:

Figure 1 is a side elevational view of a vehicle wheel with the safety clamp of the present invention in position thereon;

Figure 2 is a more or less schematic diametrical cross-sectional view of the wheel showing the relationship of the safety clamp to a tire in inflated postiion on the wheel;

Figure 3 is a fragmentary enlarged side elevational view of the slide and latch mechanism on the main arm; and Figure 4 is a fragmentary enlarged plan view of the slide and latch mechanism taken on the line IV—IV of Figure 2.

Referring to the drawings, 10 represents generally a wheel rim of a heavy duty vehicle such as a truck or a bus, said wheel having a base rim portion 11 extending axially from a vertical mounting circular disc portion, or body 12. Said body 12 has a central clearance opening 13 for the axle of the vehicle and a plurality of wheel mounting bolt holes 14 equally spaced on a circle concentric with and larger than said opening 13. A plurality of elongated apertures 15 of substantial size are equally spaced adjacent the periphery of the body, or circular disc portion 12. A permanent side flange 18 is formed radially outwardly of the outer end of the base rim portion 11.

A radially outwardly extending circumferential flange, or hump 19 is formed on the base rim portion 11 adjacent the periphery of the mounting disc or the wheel body 12 to create a recess 20 for nesting an annular split lock ring 21 therein. The lock ring 21 is generally circular in cross-section and has a tapered wedge shaped portion 22 extending axially outwardly adjacent the inner periphery thereof to form a notch 23.

A separable circumferential side flange 25 has a tire wall engaging portion 26 extending radially outwardly and axially inwardly of a generally horizontal portion 27, said portions 26 and 27 being engageable with said notch 23.

A tire 30 having a tube 31 therein as shown in Figure 2, has its side walls engaging the opposed faces of the permanent and separable flanges 18 and 25 while beads 32 of the tire engage the base rim portion 11. The bead 32 adjacent the recess 20 also overlaps the horizontal portion 27 of the separable flange.

The one piece separable side flange 25 has an internal diameter slightly greater than the diameter of the circumferential hump 19 in order to permit it to be passed freely axially outwardly thereover to contact the side wall and bead of the tire 30. The split lock ring 21 is sprung into position in the recess 20 prior to the tire 30 being inflated. The inflation pressure on the internal surfaces of the side walls and beads, causes the external surfaces of said portions to bear against the permanent and separable flanges 18 and 25, the latter flange normally locking said ring 21 securely in the recess 20. However, if the ring 21 is not properly snapped into the recess and fully seated therein throughout its entire length it may, under the high air pressures required to inflate truck or bus tires, spring out of said recess, and is thus liable to injure or kill a service man.

The safety clamp 35 of the present invention prevents the lock ring 21 from popping off the wheel rim 10 during inflation. The clamp comprises at least two and preferably three U-shaped retaining arm members or heads 36.

Each U-shaped member 36 has a center portion 37 extending in a generally axial direction for disposition adjacent the inner surface of the base rim portion 11. A relatively short terminal portion 38 extends radially outwardly from one end of said center portion 37 to overlap the permanent flange 18. A longer portion 39 extends generally radially outwardly from the opposite end of said center portion to project through one of the apertures 15 to overlap the separable flange 25 and may contact the side wall of the tire 30. It will be observed that in order to enhance the retaining characteristics of the retaining extensions 38 and 39, they are toed in or angled toward one another at least slightly.

One of the U-shaped members 36 forms a part of a center arm 40 coextensive with and extending radially inwardly from the portion 39 to a point well beyond the axial center of the tire rim 10.

In actual practice, the center arm 40 and the portion 39 are part of a single member, preferably a bar of rectangular steel stock, and the portions 37 and 38 are formed of a bar of L-shaped configuration and of similar material and welded to the center arm 40 at 41.

The remaining two U-shaped members 36 are of similar construction but form part of side arms 45 which extend radially inwardly for connection with the center arm 40.

It is desirable to provide an adjustable connection between the center and side arms in order to facilitate mounting the device on the wheel so that the device can accommodate various sized wheel rims 10. This is accomplished by providing a slide assembly 46 with a latch mechanism 47 thereon.

The slide assembly 46 (shown in Figures 3 and 4) includes upper and lower generally trapezoid shaped plates 48, 49 spaced apart a distance slightly greater than the thickness of the arms 40, 45 by spacer rivets 50 and 51 located adjacent the corners of the wide ends and narrow ends of said plates respectively. The free ends of the side arms 45 enter between the plates 48, 49 and are pivotally connected to the rivets 50. The free end of the center arm 40 enters between the side arms at the wide ends of said plates and extends beyond the narrow ends thereof, the rivets 51 acting as guides on each side of said arm.

The free ends of the side arms 45 are preferably radiused at 52 on the same centers as the rivets 50 whereby said radiused ends also act as guides for the center arm 40, regardless of the angle at which the side arms 45 extend outwardly of the plates 48, 49. The side arms 45 (as shown in Figure 1) radiate outwardly through apertures 15 generally at an angle of 120 degrees on each side of the center arm 40.

The latch mechanism 47 includes a lever 55 lying flush with the external surface of the lower plate 49 throughout most of its length. An angled handle portion 56 (see Figure 3) preferably extends beyond the narrow ends of the plates 48, 49.

A stud member 57 is threaded centrally in the lower plate 49 and extends through a clearance hole 58 in the lever 55 to support a compression spring 59 thereon. The terminal end of the stud 57 is threaded to receive a threaded washer nut 60, said nut permitting adjustment of the pressure of the spring 59 on the lever 55.

A detent means such as a pin 61 projects from the lever 55, preferably adjacent the handle portion 56, to extend through a clearance hole 62 in the lower plate 49 and engage one of a plurality of spaced adjustment recesses 63 in the center arm 40.

The recesses 63 are preferably a series of holes drilled partway into the underside of the center arm 40 a sufficient distance to permit adequate engagement by the detent pin 61 and yet not all the way through the arm 40 to cause weakening of said member. The recesses or holes 63 are equally spaced apart centrally and longitudinally of the center arm 40 generally throughout two thirds of its length from the free end thereof.

During installation of the safety clamp 35, the U-shaped members 36 associated with the side arms 45 are first located in position on a wheel, said arms as previously mentioned, being arranged generally at 120 degrees on each side of the center arm 40. The long portions 39 extend through the apertures 15 of the wheel flange 12 to overlap the separable side flange 25 and the short portions 38 overlap the side flange 18.

The handle 56 of the lever 55 is then pulled in a direction away from the center arm 40 to remove its detent 61 from a recess 63. The opposite end of the lever acts as a fulcrum against the plate 49 while the spring 59 compresses against the nut 60. The center arm 40 is then moved freely through the slide assembly 46 until its portion 39 extends through an aperture 15 and its U-shaped member 36 is in an overlapping condition relative to the side flanges 18 and 25. The handle 56 is then released and the spring 59 exerts sufficient pressure against the lever 55 to force the detent 61 into the nearest recess 63 upon slight longitudinal movement of the center arm 40 in either direction.

It is desirable to bevel the terminal end of the detent pin 61 at 64 in a direction generally parallel to the handle 56 in order that engagement of a recess 63 is facilitated when locking the center arm 40 in position. The longest side of the detent 61 faces the U-shaped member 36 of the center arm 40, thus increasing the holding power of the detent in a recess 63 if the split lock ring 21 should be accidentally ejected from its recess 20 by the expansion of the tire 30 during inflation.

It is obvious that if such accidental dislodgment of the ring 21 occurs, the arm portions 39 are sufficiently long to catch the full force of said ring and prevent it from escaping between the terminal ends thereof and the wall of the tire. The portions 38 at the opposite end of the U-shaped members 36 immediately engage the permanent flange 18 to prevent movement of the safety clamp axially inwardly of the wheel rim 10.

After the tire 30 has been completely inflated and it is observed that the lock ring 21 is still securely locked in position in its recess 20, it is then safe to operate the lever 47 to release the device from the tire rim. The side arms 45 can be swung about their pivots 50 and brought against the opposite sides of the center arm 40, thus providing a compact tool that can be easily stored in the vehicle.

It will be understood that modifications and variations may be effected without departing from the scope of the novel concepts of the present invention.

I claim as my invention:

1. In combination in a safety clamp for wheel rims of heavy vehicles such as trucks and buses and which rims include on one side a separable flange held in place by a split lock ring liable to snap out of place under inflation of a tire on the rim, the clamp including a center arm and a pair of side arms, the center arm and the side arms having rim engaging structure at their remote end portions including parts for retainingly overlying the lock ring, and slide means interconnecting the inner end portions of the side arms with the center arm, said slide means comprising a pair of opposed plates between which the arms are disposed, said plates having means connecting the end portions of the side arms therebetween pivotally and in position to serve as guides for the slide means longitudinally of the center arm.

2. A safety clamp as defined in claim 1 wherein said plates have extending therebetween on opposite sides of said center arm and spaced longitudinally along the center arm from the adjacent ends of the side arms additional guiding means to assist in guiding the slide means longitudinally of the center arm.

3. In a safety clamp for wheel rims of heavy vehicles such as trucks and buses including a separable flange on one side of the rim held in place by a split lock ring liable to snap out of place under inflation of a tire supported by the rim, the safety clamp including a center arm having an end portion for retainingly overlying the lock ring, a pair of side arms also having end portions for overlying the lock ring retainingly, and means for interconnecting the inner end portions of the side arms and said center arm for adjustment of the adjacent inner ends of the side arms longitudinally along the center arm, said means comprising a side plate having mounted thereon a latch lever lying flush with the side plate and having a handle extending beyond the side plate, a pin extending from the side plate and through a clearance aperture in the lever, a compression spring on the pin and bearing against the lever normally to hold the lever in said flush relation to the plate, and a detent element on the lever and projecting through a clearance aperture in the plate to engage in a selected one of a plurality of detent recesses spaced longitudinally of the center arm on the face thereof which opposes said plate, said lever being movable through the medium of said handle in opposition to said spring to release said detent from the recess in which engaged for effecting readjustment.

4. A safety clamp for wheel rims of heavy vehicles such as trucks and buses, said rims having a permanent side flange on one end and a separable side flange on the opposite end of a wheel rim portion extending axially of the periphery of a vertical circular disc body portion, said separable flange being held against the side wall of a tire by a split lock ring located in a recess in said wheel rim portion, comprising three U-shaped side flange restraining members attached to the radially outward ends of a pair of substantially straight side arms and a substantially straight center arm by having an L-shaped portion welded adjacent the end portions of each arm, each U-shaped member having a center portion lying axially adjacent the wheel rim portion, a portion extending radially outwardly of one end of the center portion to overlap the permanent flange, the terminal end of each of said arms extending radially outwardly a sufficient distance to pass through apertures in the vertical body portion and overlap the separable flange, slide means interconnecting the radially inward ends of the center and side arms including a pair of spaced apart plates, means pivotally connecting the inward ends of said side arms between and adjacent opposite ends of said plates, said center arm being slidable between said plates and between said ends of the side arms, latch means on said slide means including a lever lying flush with the slide plate remote from the rim attaching flange, a handle on said lever extending beyond one end of said side plate, a pin extending outwardly of said slide plate generally centrally thereof and through a clearance aperture in said lever, a compression spring on said pin, adjusting means retaining said spring on said pin, and a detent member on said lever extending through a clearance aperture adjacent said one end of said slide plate to engage one of a plurality of recesses spaced longitudinally of said center arm.

References Cited in the file of this patent

UNITED STATES PATENTS

| | | |
|---|---|---|
| 1,471,066 | Rushton et al. | Oct. 16, 1923 |
| 1,540,503 | Schofield | June 2, 1925 |
| 2,487,997 | West | Nov. 15, 1949 |
| 2,710,054 | Merriman | June 7, 1955 |